United States Patent [19]
Gembinski

[11] Patent Number: 5,096,243
[45] Date of Patent: Mar. 17, 1992

[54] BUMPER ASSEMBLY HAVING A RIM BOX SECTION

[75] Inventor: John C. Gembinski, Ypsilanti, Mich.

[73] Assignee: Davidson Textron Inc., Dover, N.H.

[21] Appl. No.: 474,995

[22] Filed: Feb. 5, 1990

[51] Int. Cl.⁵ .............................................. B60R 19/08
[52] U.S. Cl. ...................................... 293/120; 293/122; 264/257
[58] Field of Search ............... 293/120, 122, 109, 134, 293/136; 264/257, 258

[56] References Cited

U.S. PATENT DOCUMENTS

| | | | |
|---|---|---|---|
| 4,320,913 | 3/1982 | Kuroda | 293/122 |
| 4,361,352 | 11/1982 | Wakamatsu | 293/120 |
| 4,504,534 | 3/1985 | Adachi | 264/DIG. 5 |
| 4,525,005 | 6/1985 | Prochaska | 293/122 |
| 4,569,865 | 2/1986 | Placek | 293/120 |
| 4,597,601 | 7/1986 | Manning | 293/122 |
| 4,652,032 | 3/1987 | Smith | 293/120 |
| 4,671,550 | 6/1987 | Molnar | 293/120 |
| 4,715,630 | 12/1987 | Manning | 293/120 |
| 4,722,563 | 2/1988 | Loren | 293/120 |
| 4,733,894 | 3/1988 | Lamparter | 293/120 |
| 4,941,701 | 7/1990 | Loren | 293/120 |

Primary Examiner—Jay H. Woo
Assistant Examiner—Jeremiah F. Durkin, II
Attorney, Agent, or Firm—Reising, Ethington, Barnard, Perry & Milton

[57] ABSTRACT

A bumper assembly having a fascia and a support member including an integral core made of a fiber reinforced composite resin adapted to be connected to a vehicle frame. The integral core has a back plate portion adapted to extend vertically of the front end of a vehicle and a plurality of reinforcing boxes formed with the back plate and extending forwardly and transversely. One of the reinforcing boxes is located at the top of the back plate and another is located at the bottom of the back plate. A cavity between the back plate and the fascia is filled with an energy absorbent material.

3 Claims, 2 Drawing Sheets

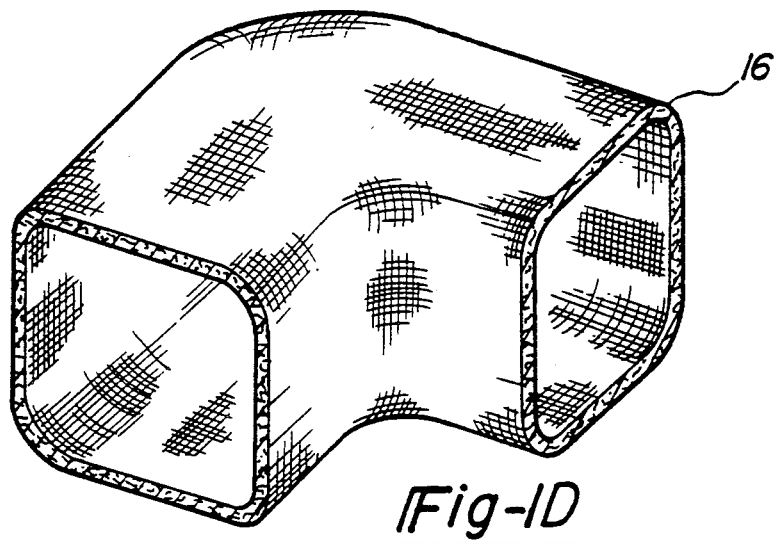
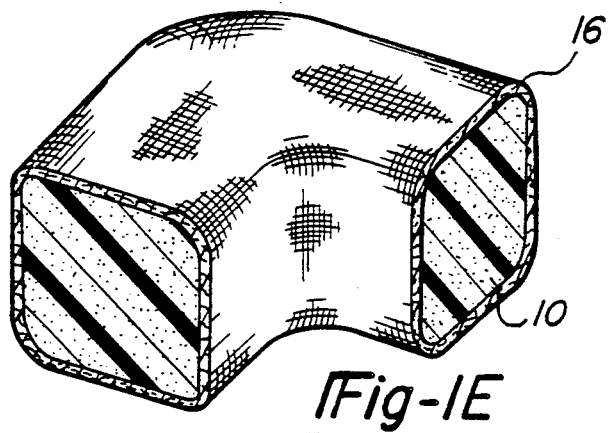
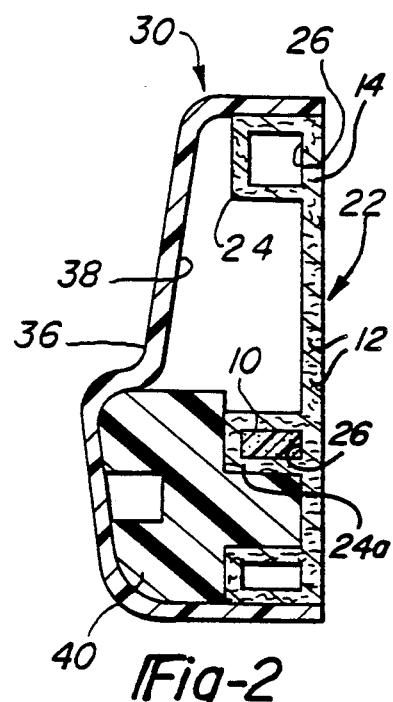
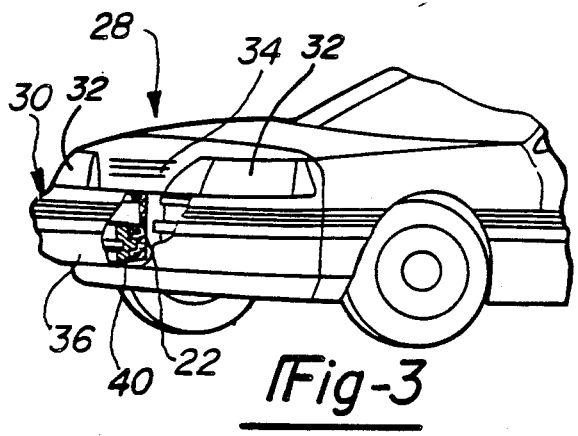

BUMPER ASSEMBLY HAVING A RIM BOX SECTION

TECHNICAL FIELD

The present invention relates to processes for forming cured polymeric objects and the objects and assemblies made therefrom. More specifically, the invention relates to a method of fabricating a high strength composite structure which can be used as a rigid support structure for supporting energy absorbing materials, light fixture assemblies and other modules which are components of integrated front end assemblies of automobiles.

BACKGROUND OF THE INVENTION

Rigid structural supports presently in use such as front end assemblies of automobiles, can include box sections to obtain high strengths. In the metal working industry, these box sections are formed by roll forming sections which are welded into the form of the box sections. Such box sections have been made from composite materials. In the composite industry, flat sections are bonded into open "C" channels to obtain the box sections. Alternatively, such box sections can be made from metal sheets. the sheet molding process, transverse vertical ribs connect the walls of the open "C" sections to give the formed members high strength. In each of the aforementioned processes, a box section is made to provide strength.

It is presently desirable to manufacture modular integrated assemblies wherein a single structural support is used to support the energy absorbing material, as well as other modular units such as the head light assembly. Unlike prior art processes which either utilizes high weight material such as metals or composite processes which require various steps, the present invention provides a method of fabricating a high strength composite material with a minimum amount of steps so as to provide a light weight unitary structural component.

The U.S. Pat. Nos. 2,739,350 to Lampman, issued Mar. 27, 1956 and 4,615,855 to Orlowski et al, issued Oct. 7, 1986 relate to methods and means of forming or molding composite articles. The Lampman patent discloses a method including the steps of applying a thermosetting plastic material to the exterior surface of a preformed interior mold which is preferably made of a material from a thermoplastic group, at a temperature where the thermoplastic interior mold is normally firm. The material covered mold is enclosed inside of a rigid exterior mold. The interior mold is pressurized to maintain the mold in a rigid state. The applied plastic material is cured while the interior mold is pressurized. The pressure from the interior mold is removed when the cure is completed and the exterior mold is removed. The interior mold is removed from the formed part at a temperature where the interior mold is thermoelastic and capable of being deformed for easy removal.

The Orlowski et al patent discloses a process for forming a composite article including the steps of making a plug from a meltable material and covering the plug with a polymerizable material. The covered plug is inserted into a cavity formed in a thermally expansive and heat resistant polymer held within a rigid container. The almost filled container is covered and the container and part are heated to cause curing of the polymerizable covering. The cured assemblies are removed from the thermally expansive and heat resistant polymer and heated to an extent sufficient to melt the core. Thusly, both the Lampman and Orlowski et al patents disclose methods of forming hollow core members.

The U.S. Pat. No. 2,476,993 to Milton, Jr. et al, issued July 24, 1949 discloses a wax core with a metal mold covering formed by spraying on the core. The core is melted to leave a hollow metal mold for gloves.

The U.S. Pat. No. 3,410,942 to Bayer, issued Nov. 12, 1968 discloses a polystyrene pattern covered with a thin layer of polyvinyl. Metal is cast into a mold to vaporize the pattern as the metal molding is formed.

The U.S. Pat. No. 3,518,338 to Tambussi, issued June 30, 1970 discloses a process in which fiberglass is impregnated with resin. A water soluble forming mandrel is removed from the cured part to form a hollow core.

The U.S. Pat. No. 3,758,653 to Patel et al, issued Sept. 11, 1973 discloses a ceramic form process which uses a polystyrene mandrel which is dissolved by gasoline.

The U.S. Pat. Nos. 3,840,626 to Laskawy et al, issued Oct. 8, 1974; 4,040,163 to Tronsberg, issued Aug. 9, 1977; 4,271,116 to Jones, issued June 2, 1981; 4,590,026 to Goto, issued May 20, 1986 disclose other processes in which a mold armature is dissolved to form a hollow part.

The U.S. Pat. Nos. 3,234,309 to Graff, issued Feb. 8, 1966; 4,122,142 to Lawrence et al, issued Oct. 24, 1978; and 4,314,964 to Ferrary, issued Feb. 9, 1982 disclose processes in which a mold armature is inflated to form the part. The armature is deflated and removed after the part is molded.

None of the aforementioned processes relate to reaction injection molding chemistry or tooling or the specific steps disclosed as the present invention or the specific assemblies and parts made therewith.

SUMMARY OF THE INVENTION

In accordance with the present invention, there is provided a method of fabricating a high strength composite structure, the method including the steps of forming a core member in a predetermined shape and wrapping porous reinforcement material over the core member. A resin is molded into the porous reinforcement material to form a foam filled fiber reinforced box section.

The present invention further provides an exterior trim assembly including at least one hollow box section having a fibrous material forming a predetermined shape, the fibrous material having interstices throughout. A resin impregnates the interstices.

Further in accordance with the present invention, there is provided an energy absorbing bumper assembly including a rigid support member, an elongated outer shell mounted over the support member and defining a cavity therebetween, and an energy absorbing material contained within the cavity. The support member includes at least one elongated box section consisting essentially of a wrapped fiber including interstices filled with resin.

BRIEF DESCRIPTION OF THE DRAWINGS

Other advantages of the present invention will be readily appreciated as the same becomes better understood by reference to the following detailed description when considered in connection with the accompanying drawings wherein:

FIGS. 1A-E illustrate the subject method of forming a core element (FIG. 1A), forming a shell about the core (FIG. 1B), an injection molding resin (FIG. 1C), the final molded hollow part (FIG. 1D), and a final molded core filled part (FIG. 1E) FIGS. 1A, B, D and E being perspective views of the formed part and FIG. 1C being a cross sectional view of the formed part within a mold;

FIG. 2 is cross sectional elevational view of a modular integrated front end assembly constructed in accordance with the present invention; and FIG. 3 is perspective view of an automobile front end utilizing the present invention.

DETAILED DESCRIPTION OF THE INVENTION

Figure 1A:
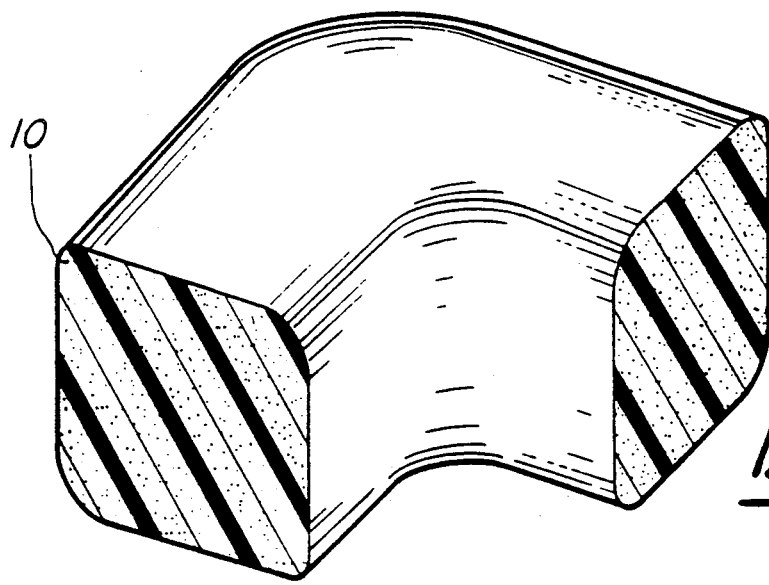
Figure 1B:
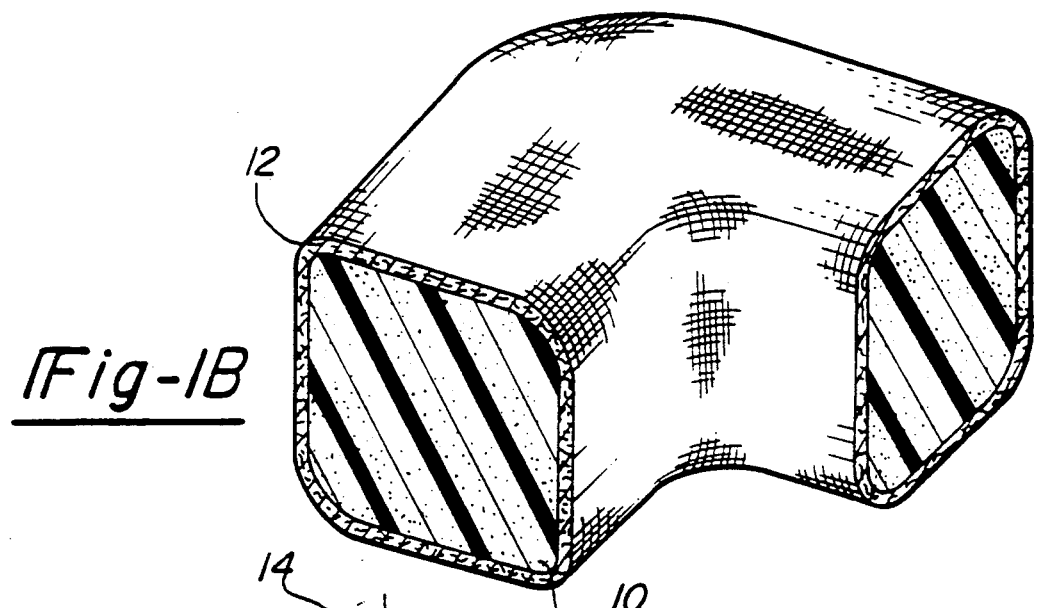

The method of fabricating a high strength composite structure made in accordance with the present invention is illustrated in FIGS. 1A-D. Generally, the method includes the steps of forming a core member 10 in a predetermined shape, wrapping a porous reinforcement material 12 over the core member 10, and molding a resin 14 into the porous reinforcement material 12 to form a foam filled fiber reinforced box section shown at 16 in FIG. 1D.

More specifically, a core member 10 is formed or preshaped as required to manufacture the finally desired shape of the composite box structure 16. The core member 10 can be made from a low density foam filler, such styrene beads. The foam filler can be made from a higher melting point solid or a lower melting point solid for reasons set forth below.

The core member 10 is wrapped with the desired reinforcement material, which can be any type of high strength fiber. Examples of high strength fibers are carbon, Aramid, polyester, or glass fibers. The fibers 12 can be secured about the core member 10 by various means such as staples or other bonds or adhesives to the core member surface.

Figure 1C:
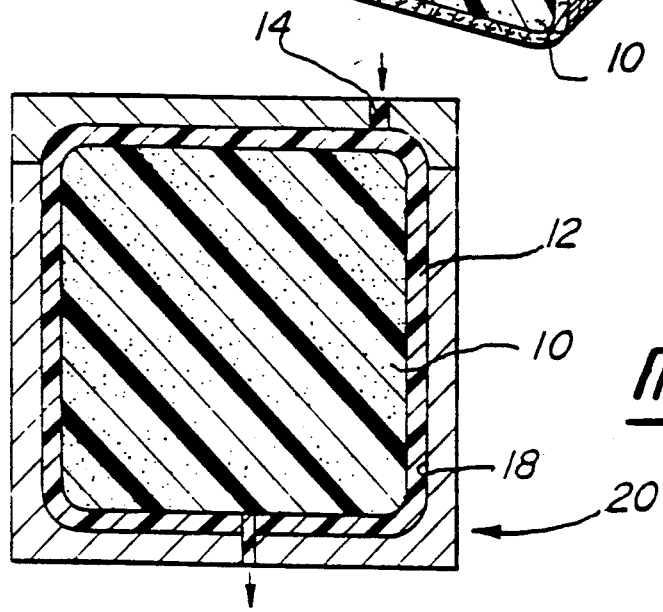

A shown in FIG. 1C, the wrapped core material 10 is disposed into a cavity 18 of reaction injection mold generally indicated at 20. The resin 14 is injected to the mold 20 so as to fill the interstices of the porous reinforcement material 12 thereby conforming with the shape of the cavity 18 and the outer surface of the core member 10. The resin can be chosen from various reaction injection mold type resins, such as urethane, polyester, nylon, epoxy or acrylic, with it being understood that liquid injectable thermoplastic materials are also suitable for practicing the invention.

If the core member 10 has a melting point which is less than the peak exotherm temperature of the injected resin, the exotherm temperature of the injected resin will melt the core member 10 which can be removed thereby forming a hollow rigid structural member as shown in FIG. 1D. During this process, the resin and core member material are chosen such that the peak exotherm temperature occurs after the resin is gelled into shape. Thusly, the hollow formed structural member 16 is formed and the shape fixed prior to the melting and removal of the core member 10. The hollow section is produced by the exotherm of the structural resin being high enough and the exotherm of the preform core member 10 and the molding pressure being low enough not crush the preform.

Alternatively, if the core member 10 is made from a material having a higher melting point above the peak exotherm temperature of the resin, a foam filled structural member is produced as shown in FIG. 1E.

Alternatively, the reinforced hollow section could also be made utilizing a low cost blow molded preform as opposed to the foam preform 10. Subsequently, the blow molded preform is covered with the fiber reinforcement material 12 and disposed into the mold 20 where resin is injected as discussed above.

In accordance with the present invention, an exterior trim assembly 22 is made wherein the trim assembly includes at least one hollow box section 24 including the fibrous material 12 forming the predetermined shape thereof and having interstices throughout, a resin 14 impregnating the interstices. The hollow box sections 24 include a central chamber 26. The central chamber 26 may be hollow or may include the formed core material 10 filling the chamber 26. Using the nonmelting filler foam and producing a foam filled section 24a, the structure will have added higher rigidity.

FIG. 3 shows an automobile 28 including a modular integrated front end 30, the modular integrated front end 30 being shown in detail in FIG. 2. The modular integrated front end 30 integrates the energy absorbing bumper assembly through the unitary support 22 for supporting other fixtures of the front end assembly, such as the head lamps 32 and grill assembly 34. In other words, the energy absorbing bumper assembly is integral with the means supporting the other fixtures of the front end. Alternatively, the same type of structure can be used to support an integrated rear end of an automobile.

More specifically, the assembly includes the rigid support member 22 constructed in accordance with the inventive method of the present invention. An elongated outer shell or skin 36 is mounted over the support member 22 and defines a cavity 38 therebetween. An energy absorbent material 40 is contained within the cavity 38. The support member 22 includes a plurality of the elongated box sections 24 which consist essentially of the wrapped fiber having interstices filled with the resin constructed in accordance with the present invention.

As best shown in FIG. 2, some of the box sections 24 have the inner cavities 26 and the rigid core material 10 contained therein. As previously discussed, this core material is a nonmelting filler foam. The filler foam adds higher rigidity to the structure. Other cavities 26 are hollow. The hollow cavities can be utilized in the structure as integral chambers for carrying a vacuum air pressure or other pressure fluids for use in accessories located across the modular integrated front end assembly. Alternatively, the chambers or cavities 26 can serve as reservoirs for windshield washer fluid, antifreeze fluid, brake fluid, or as a reserve fuel supply. In other words, the assembly 30 can be used to support various fixtures, support the energy absorbent material 40, and also provide conduits through the hollow box structures 24 to various other units, such as a heat exchange system. The multiple inner cavities 26 have strong structural walls that strengthen the unitary support 22. This is possible because pursuant to the inventive method, the inventive structure provides seamless walled chambers of a shape predetermined by the shape of the preformed core member 10.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A bumper assembly having a fascia and a support member adapted to be connected to a vehicle frame;

said support member including an integral core of high strength fibers with interstices filled with resin;

said integral core having a back plate portion adapted to extend vertically of the front end of a vehicle and a plurality of reinforcing boxes integrally formed with said back plate portion and extending forwardly and transversely thereof;

one of said reinforcing boxes located at the top of said back plate portion and another of said reinforcing boxes located at the bottom of said back plate; and said fascia having top and bottom edge portions secured respectively to said one of said reinforcing boxes at the top of said back plate portion and to said another of said reinforcing boxes at the bottom of said back plate portion for forming a cavity between said fascia and said back plate portion and energy absorbent material contained within a portion of said cavity in engagement with said fascia and said back plate portion.

2. An assembly as set forth in claim 1 wherein said reinforcing boxes have inner cavities and at least one of said inner cavities has a rigid core material contained therein.

3. An assembly as set forth in claim 2 wherein said core material is a nonmelting filler foam.

* * * * *